United States Patent [19]
Gerstenberg

[11] Patent Number: 5,828,338
[45] Date of Patent: Oct. 27, 1998

[54] THYRATRON SWITCHED BEAM STEERING ARRAY

[75] Inventor: John W. Gerstenberg, Lake Elsinore, Calif.

[73] Assignee: Hughes Electronics, Los Angeles, Calif.

[21] Appl. No.: 652,889

[22] Filed: May 23, 1996

[51] Int. Cl.$^6$ ........................................... G01S 5/02
[52] U.S. Cl. .................... 342/374; 455/103; 455/127
[58] Field of Search .................. 342/417, 374, 342/368; 455/103, 127, 91

[56] References Cited

U.S. PATENT DOCUMENTS

| | | | |
|---|---|---|---|
| 2,919,440 | 12/1959 | McLaughlin | 342/374 |
| 3,569,976 | 3/1971 | Korvin | 343/777 |
| 3,657,656 | 4/1972 | Cooper | 325/130 |
| 3,766,551 | 10/1973 | Burnsweig et al. | 343/5 DP |
| 4,051,439 | 9/1977 | Nyswander | 325/121 |
| 4,121,221 | 10/1978 | Meadows | 343/854 |
| 4,129,870 | 12/1978 | Toman | 343/106 R |
| 4,482,816 | 11/1984 | Richarson et al. | 307/106 |

*Primary Examiner*—Thomas H. Tarcza
*Assistant Examiner*—Dao L. Phan
*Attorney, Agent, or Firm*—Charles D. Brown; Wanda K. Denson-Low

[57] ABSTRACT

A beam steering array that comprises a high voltage source for providing high voltage pulses and a plurality of high voltage switches coupled between the high voltage source and a plurality of microwave sources. Each of the microwave sources are coupled to an antenna element. A trigger source is coupled to the plurality of high voltage switches for providing trigger pulses thereto that are used to selectively switch the respective switches on and off to transfer the high voltage pulses from the high voltage source to a selected microwave source. In a reduced to practice embodiment, the present invention provides for a thyratron switched beam steering array comprising a plurality of channels that each include a high voltage switch comprising a thyratron, a triggering circuit, a magnetron that is used as the microwave source, and an antenna element coupled to the magnetron.

13 Claims, 2 Drawing Sheets

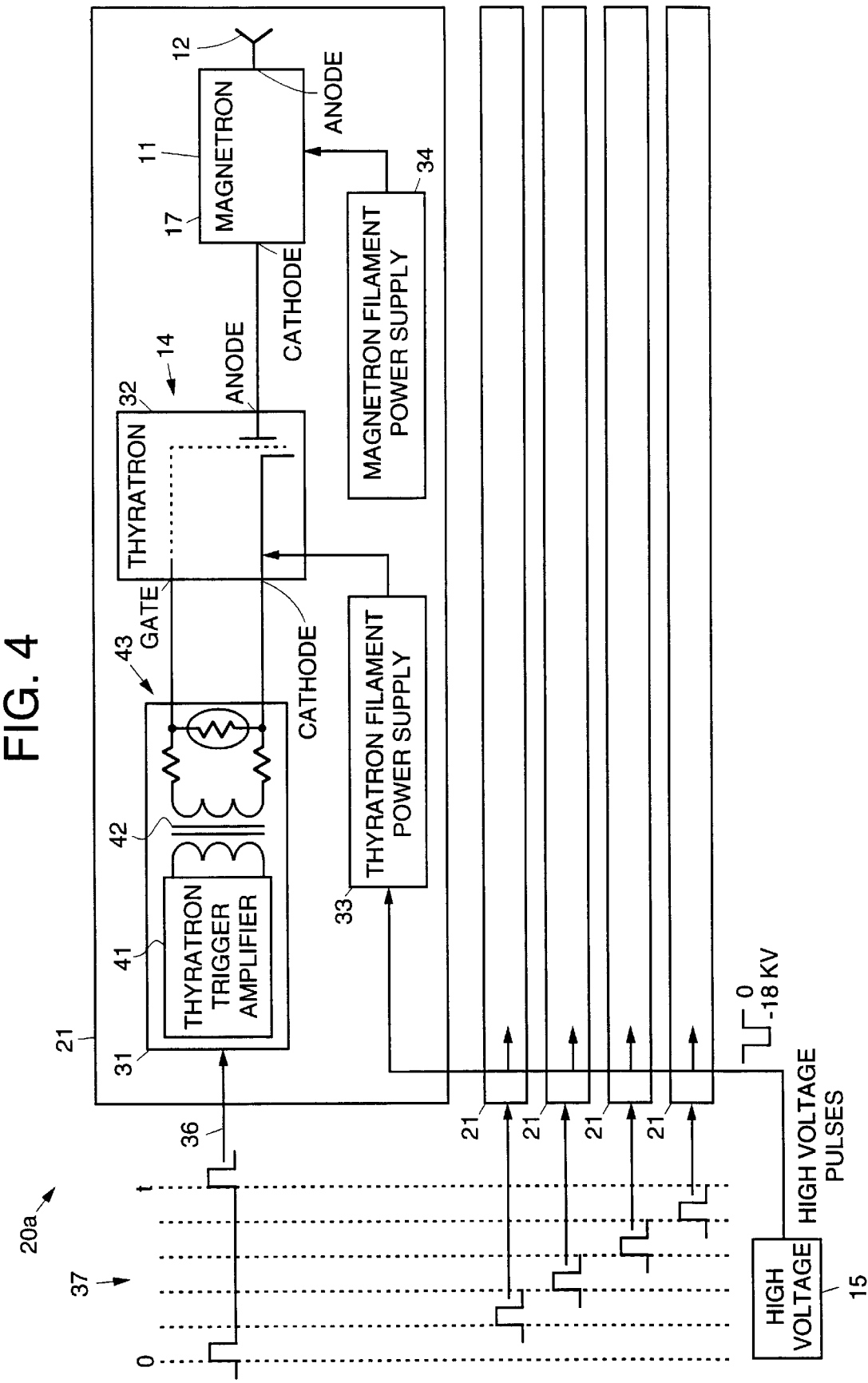

THYRATRON SWITCHED BEAM STEERING ARRAY

BACKGROUND

The present invention relates generally to beam steering arrays, and more particularly, to a thyratron switched beam steering array.

Prior art relating to the present invention includes conventional mechanical beam steering arrays. The mechanical beam steering array steers the beam by mechanically gimballing the antenna. The mechanical beam steering array is primarily limited by the rotational speed or stewing speed of its antenna pedestal.

A second approach is to engage waveguide switches port-to-port and radiate alternately out of each array element. However, the speed of WR-975 waveguide switches, for example, is 2–4 seconds, and is impractical for use in most beam steering arrays. These constraints require the use of a coherent source or multiple sources with modulated anodes.

Accordingly, it is an objective of the present invention to provide for an improved electronic beam steering array. It is a further objective of the present invention to provide for an improved thyratron switched beam steering array.

SUMMARY OF THE INVENTION

To meet the above and other objectives, the present invention is a beam steering array that comprises a high voltage source for providing high voltage pulses. The high voltage source is coupled by way of a plurality of high voltage switches to a respective plurality of microwave sources. Each of the microwave sources has an antenna elements. The plurality of high voltage switches are used to switch the high voltage pulses supplied by the high voltage source. A trigger source is coupled to the plurality of switches for providing trigger pulses to each of the switches that are used to selectively switch the respective switches on and off to transfer the high voltage pulses from the high voltage source to a selected microwave source.

In a reduced to practice embodiment, the present invention provides for a thyratron switched beam steering array comprising a plurality of RF channels that each include a high voltage switch comprising a thyratron, a triggering circuit, a magnetron, and an antenna element. The present invention sequentially switches high voltage pulses among the magnetrons. The effective beam is emitted by each magnetron and antenna combination one after another in accordance with the sequential switching scheme. This provides for a beam coverage angle of five times that of a single antenna element. Furthermore, the use of a different number of channels provides for an appropriate angular coverage that is a function of the number of channels.

The thyratron switched beam steering array may be switched between RF channels (or RF magnetrons) at a maximum rate of about 75 pulses per second, limited by pulse width, number of magnetrons, and average available power. Interpulse switching times between antenna elements of the array are on the order of about two milliseconds. This time is limited to the clearing time required by the high voltage switch or thyratron. The reduced to practice embodiment of the thyratron switched beam steering array allows a user to switch from one RF magnetron to the next in less than two milliseconds. Rapid angular beam steering can thus be provided by the present invention.

The reduced to practice embodiment of the thyratrons used in the present thyratron switched beam steering array allows fast switching among the high power microwave tubes or magnetrons that are each coupled into a separate antenna. The present invention does not require a coherent microwave source nor does it require a modulated anode. The switched array may be driven with 1, 2, 3, 4 or 5 microwave tubes or magnetrons engaged that are limited by waveform timing. This scheme can be made to provide any desired switching order.

The present invention provides an alternative to conventional methods of beam steering a single coherent microwave source. The key advantages of the present invention are the relatively fast switching speeds (approximately 2 milliseconds between pulses) and the ability to drive multiple microwave tubes or magnetrons in sequential order. This design concept provides the versatility of driving microwave tubes or magnetrons with different characteristics such as frequency and pulsed current.

The present invention may be used in beam steering arrays having multiple load switching requirements. The present invention may be also used in industrial heating processes where magnetrons of this sort are used.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 illustrates a reduced to practice thyratron switched beam steering array in accordance with the principles of the present invention.

DETAILED DESCRIPTION

In developing the present invention, two alternative approaches were investigated to implement an electronic beam steering array 20 in accordance with the principles of the present invention. These two approaches include an electromagnetic biased beam steering array 10 shown in FIG. 1 and a high voltage switching beam steering array 20 generally shown in FIGS. 2 and 3. Both of these types of beam steering arrays 10, 20 use incoherent microwave RF sources 11.

Figure 1:
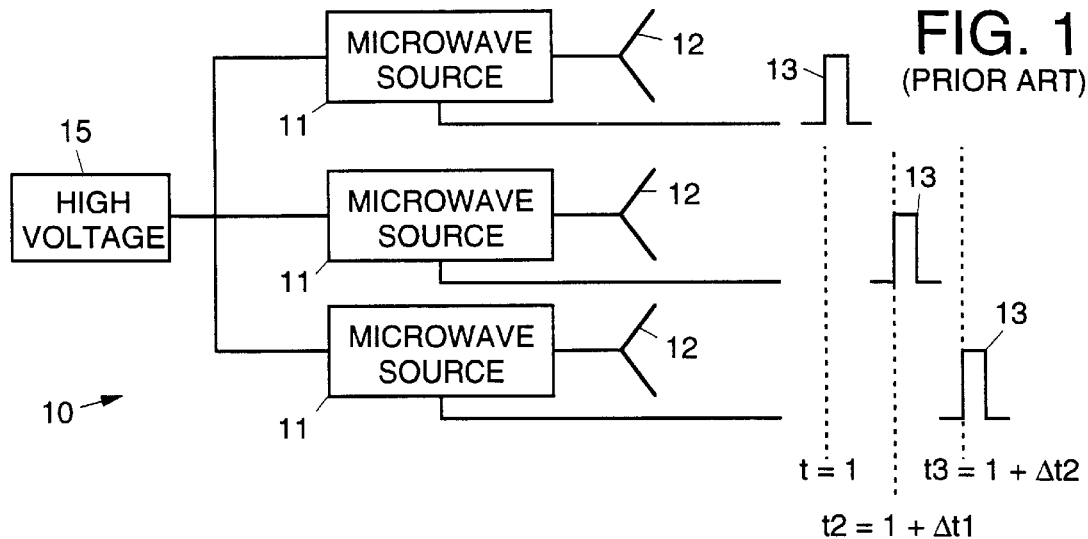
FIG. 1 depicts multiple electromagnetically biased sources used in a conventional beam steering array.

Referring now to the drawing figures, FIG. 1 depicts multiple electromagnetically biased sources 11 used in a beam steering array 10. The beam steering array 10 includes a high voltage source 15 that provides a high voltage input to a plurality of microwave sources 11 that are each coupled to respective antenna elements 12. A plurality of trigger pulses 13 are sequentially applied to the microwave sources 11 to cause them to output an output beam from the respective antenna elements 11.

The electromagnetic biasing switching embodied in the beam steering array 10 of FIG. 1 requires that the RF sources 11 contain electromagnets (not shown). The RF sources 11 are alternately triggered by switching the bias applied to the appropriate electromagnet on and off to cut off conduction.

This provides a beam steering array 10 that functions in a manner similar to a modulating anode used with many coherent RF sources.

The electromagnet used in the RF sources 11 of the beam steering array 10 has high inductance and is difficult to switch rapidly without high current and voltage overshoot. The electromagnets typically require water cooling and are several pounds heavier than if a permanent magnet is used. Complicated biasing supplies and large and heavy electromagnets made this approach undesirable. Accordingly, the preferred embodiment of the present invention is implemented using a high voltage switching approach as will be described below.

Figure 2:
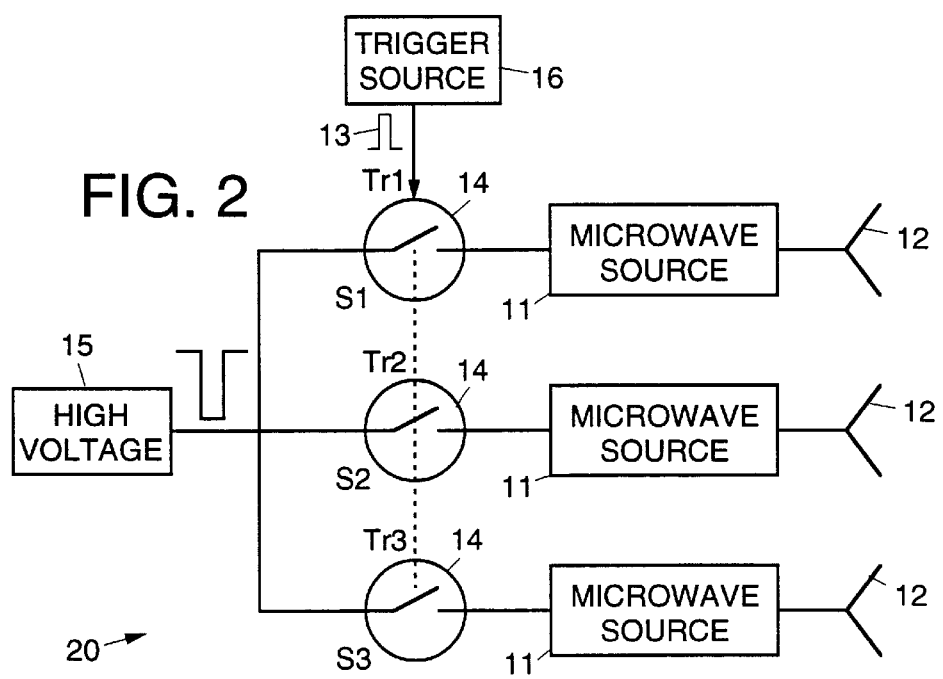
FIG. 2 illustrates a beam steering array comprising a plurality of high voltage switched microwave sources in accordance with the principles of the present invention.
Figure 3:
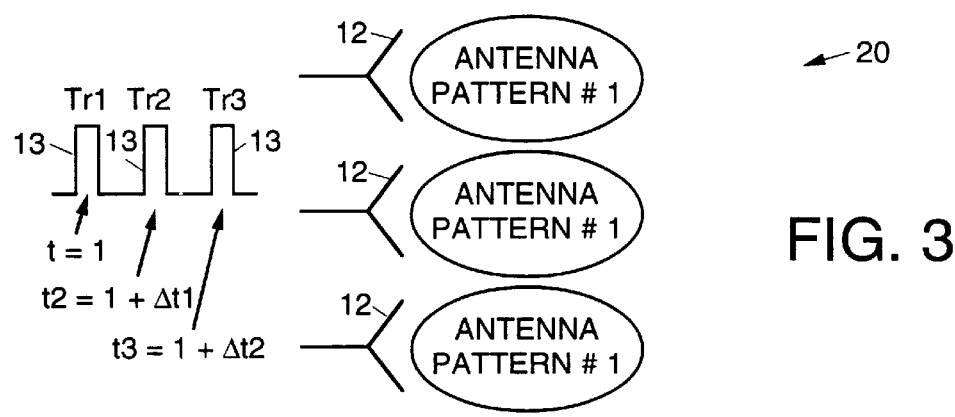
FIG. 3 illustrates a sequential RF pulse pattern or pulse train produced by sequentially triggering switches of the array of FIG. 2 to radiate a beam from one antenna at a time.

FIG. 2 illustrates the basic concept of the present invention and shows a beam steering array 20 comprising a plurality of high voltage switched microwave sources 11, and includes a high voltage source 15 that is coupled by way of a plurality of high voltage switches 14 to the plurality of microwave sources 11. Each of the plurality of microwave sources 11 is coupled to an antenna element 12. Trigger pulses 13 are provided by a trigger source 16 coupled to each of the switches 14 that are used to selectively switch the respective switches 14 on and off. With reference to FIG. 3, by sequentially applying a series of trigger pulses 13 (Tr1, Tr2, Tr3) to the respective switches 14, a sequence of antenna patterns is produced from the antenna elements 12.

High voltage switching such as is shown in the beam steering array 20 of FIG. 2 allows pulsing of individual microwave sources 11 one at a time. This may be achieved by pulsing a high voltage line from the high voltage source 15 and then simultaneously triggering the appropriate high voltage switch 14. This connects high voltage to the selected microwave source 11. In order to meet the pulse power requirements for a reduced to practice embodiment of the present invention, the specific high voltage switches 14 that were selected were hydrogen thyratrons 32 (FIG. 4). All other available high voltage switches 14 were limited by average current, pulse width, PRF, lifetime, size, weight, or power requirements.

The high voltage switching approach of FIG. 2 was selected to implement a reduced to practice embodiment of the present invention, which comprises a thyratron switched beam steering array 20a. FIG. 4 illustrates the reduced to practice thyratron switched beam steering array 20a of the present invention.

The thyratron switched beam steering array 20a includes a high voltage source 15 or power supply 15. The high voltage source 15 produces a high voltage output pulse of about 18 KV which is applied to a plurality of separate amplifier channels 21, shown in FIG. 4 as five RF channels 21. Each RF channel 21 includes a triggering source 31 that may be optically triggered by means of digital optical pulses 37, for example. The optical pulses 37 are applied by way of optical couplers 36 to the triggering source 31 of the channel 21. The triggering source 31 comprises a thyratron trigger amplifier 41 that amplifies the applied pulse to 800 volts, for example, and a transformer 43 and resistor network 43 that produce the desired 800 volt pulse.

The output of the triggering source 31 is coupled to the high voltage switch 14, which in this case comprises the thyratron switch 32 which has an associated filament power supply 33. The output of the thyratron switch 32 is coupled to a magnetron 17 (the microwave source 11) whose output is coupled to an antenna element 12. The thyratron switch 32 has a filament power supply 34 coupled thereto.

The principle of operation of the thyratron switched beam steering array 20a is as follows. The triggering source 31 utilizes continuous repetitive pulsing. However more complex waveforms may be used if desired. In this case, each channel 21 is sequentially triggered using optical pulses applied by way of the optical couplers 36, for example, which are amplified to 800 volt pulses by the thyratron trigger amplifier 41. These pulses cause the thyratron switch 32 to conduct when high voltage is present on its cathode. The high voltage is then transferred to the magnetron 35 coupled to the output of the thyratron switch 32. Firing one magnetron 35 after another produces a beam steering effect. The beam steering array 20a permits any sequence of magnetrons 35 to be triggered.

The key advantages of the thyratron switched beam steering array 20a are that is provides rapid angular steering, uses long RF pulse widths (tens of milliseconds), provides for regular or nonregular beam steering sequencing, may be used to switch selected microwave sources 11, it exhibits RF source versatility, is layout independent, and does not require an electromagnet. Utilizing high voltage switching in accordance with the principles of the present invention allows the magnetrons 35 to use lighter and smaller permanent magnets instead of electromagnets. Therefore, neither power nor water cooling is needed. This provides for the smallest and lightest overall beam steering array 20a that may be produced using existing technology. Hydrogen thyratrons 32 may be preferably used as the switches 14, and in the case of the reduced to practice embodiment of the array 20a. The hydrogen thyratrons 32 were used to meet average current and switching time requirements of the design, and provided the smallest, lightest, lowest cost, most reliable, and most robust high voltage switch 14.

The present beam steering array 20a steers a microwave beam about an angle of ±45 degrees several times a second. The use of the magnetrons 35 eliminates the use of conventional coherent RF sources. Therefore, the present invention provides for a rapid angular beam steering system that is implemented by electronically switching several magnetrons 35 (microwave tubes 35) driven from a single high voltage power supply 15. The overall system was designed to activate the magnetrons 35 as required, utilizing complex waveforms if desired. Design parameters of the thyratron switched beam steering array 20a are as shown in Table 1.

TABLE 1

| Peak voltage | 25 KV |
|---|---|
| Interpulse switching time | approximately 2 milliseconds |
| Peak current | 1500 amps |
| RMS current | 47.5 amps by five array elements |
| Trigger pulse | 8 microseconds |
| Pulse repetition frequency (PRF) | <15 pulses per second by five array elements |
| Pulse width | <20 ms by five array elements |
| Duty cycle | <15% by five array elements |

The design of the present invention allows a single high voltage power supply 15 to be used which reduced overall system size and weight. High voltage pulses are simultaneously present on the cathodes of all thyratron switches 32, but are connected to only one magnetron 35 at any time using the triggering source 31. Thyratron trigger pulses are timed so that the high voltage pulse is present at the magnetron 35 to insure conduction. The thyratron switched beam steering array 20a can engage 1, 2, 3, 4 or 5 magnetrons 35 depending on control circuitry used therewith. This scheme allows any magnetron switching combination to be provided. Digital trigger inputs 37 may be PRF and pulse width adjustable without exceeding the parameters listed in Table 1.

The present invention provides a solution for rapidly steering a beam while minimizing the volume and weight. The design of the present invention provides the most versatile solution to drive multiple magnetrons 35 with a single high voltage pulse power supply 15. The present arrays 20, 20a use an incoherent RF source 11 such as a magnetron, and this solution is ideal in meeting stringent objectives of rapidly steering a microwave beam over wide angular sweeps (>90 degrees) several times a second with long millisecond RF pulse characteristics. This design principle has been successfully implemented and demonstrated using prototype hardware corresponding to the thyratron switched beam steering array 20a shown in FIG. 4.

Thus, a thyratron switched beam steering array has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A beam steering array comprising:
   a high voltage source for providing high voltage pulses;
   a plurality of high voltage switches coupled to the high voltage source;
   a plurality of microwave sources respectively coupled to the plurality of switches;
   a plurality of antenna elements respectively coupled to the plurality of microwave sources; and
   a trigger source coupled to the plurality of switches for providing trigger pulses to each of the switches that are used to selectively switch the respective switches on and off to transfer the high voltage pulses from the high voltage source to a selected microwave source.

2. The array of claim 1 wherein each of the high voltage switches comprises a thyratron switch.

3. The array of claim 2 wherein the triggering source comprises a thyratron trigger amplifier.

4. The array of claim 2 wherein the thyratron switch further comprises a filament power supply.

5. The array of claim 1 wherein the plurality of microwave sources each comprise a magnetron.

6. The array of claim 5 wherein the magnetron further comprises a filament power supply.

7. A beam steering array comprising:
   a high voltage source for producing high voltage output pulses;
   a plurality of separate RF channels, that are each coupled to the high voltage source and that each comprise:
      a high voltage switch;
      a magnetron coupled to the high voltage switch; and
      an antenna element coupled to the magnetron; and
   a trigger source coupled to the high voltage switch of each of the RF channels for providing trigger pulses thereto that are used to selectively switch the high voltage switch on and off to transfer the high voltage pulses from the high voltage source to the magnetron.

8. The array of claim 7 wherein the triggering source is optically triggered by means of applied optical pulses.

9. The array of claim 7 wherein the triggering source comprises a thyratron trigger amplifier.

10. The array of claim 9 wherein the thyratron trigger amplifier further comprises a transformer and resistor network.

11. The array of claim 7 wherein the high voltage switch comprises a thyratron switch.

12. The array of claim 11 wherein the thyratron switch further comprises a filament power supply.

13. The array of claim 8 wherein the applied optical pulses are coupled to the triggering source by way of optical couplers.

* * * * *